United States Patent [19]
Earl et al.

[11] Patent Number: 5,670,238
[45] Date of Patent: Sep. 23, 1997

[54] LAMINATE SHEET MATERIAL

[75] Inventors: Gary L. Earl, Hoquiam; William A. Goodwin, Longview, both of Wash.

[73] Assignee: Anderson & Middleton Company, Hoquiam, Wash.

[21] Appl. No.: 490,455

[22] Filed: Jun. 14, 1995

Related U.S. Application Data

[63] Continuation-in-part of Ser. No. 421,328, Apr. 13, 1995.

[51] Int. Cl.$^6$ .............................. B32B 3/28; B01D 39/08
[52] U.S. Cl. .................... 428/182; 428/534; 428/920; 55/521
[58] Field of Search ..................... 428/182, 184, 428/913, 191, 920, 534; 55/521, 524

[56] References Cited

U.S. PATENT DOCUMENTS

| | | | |
|---|---|---|---|
| 4,748,066 | 5/1988 | Kelly et al. | 428/182 |
| 5,008,359 | 4/1991 | Hunter | 527/103 |
| 5,140,086 | 8/1992 | Hunter et al. | 428/537.1 |
| 5,280,097 | 1/1994 | Hunter et al. | 428/536 |
| 5,580,922 | 12/1996 | Park et al. | 428/264 |

*Primary Examiner*—Donald Loney
*Attorney, Agent, or Firm*—Nixon & Vanderhye P.C.

[57] ABSTRACT

A composite laminate member includes outer layers of a polymer cellulose material sandwiched about a core of corrugated cardboard, the core of corrugated cardboard having flutes running in a plane parallel to the outer layers. An exemplary embodiment includes a filter medium separator for use in air filter constructions including a composite laminate member comprising outer layers of a polymer cellulose material and a fire retardant additive sandwiched about a core of corrugated cardboard.

6 Claims, 4 Drawing Sheets

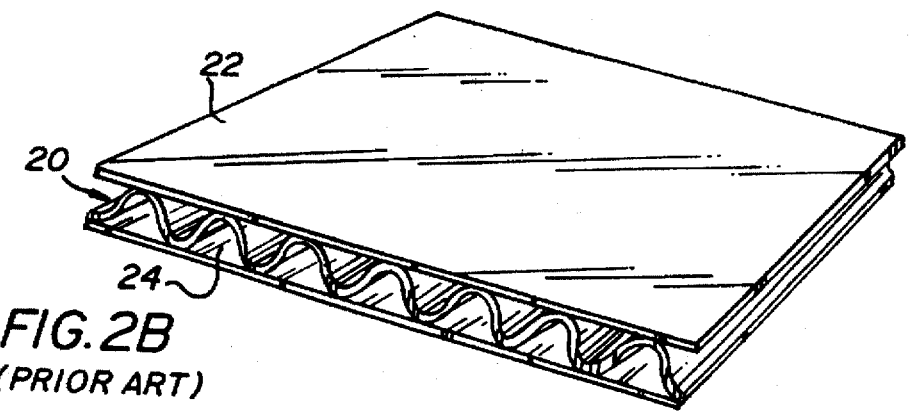
FIG.2B
(PRIOR ART)
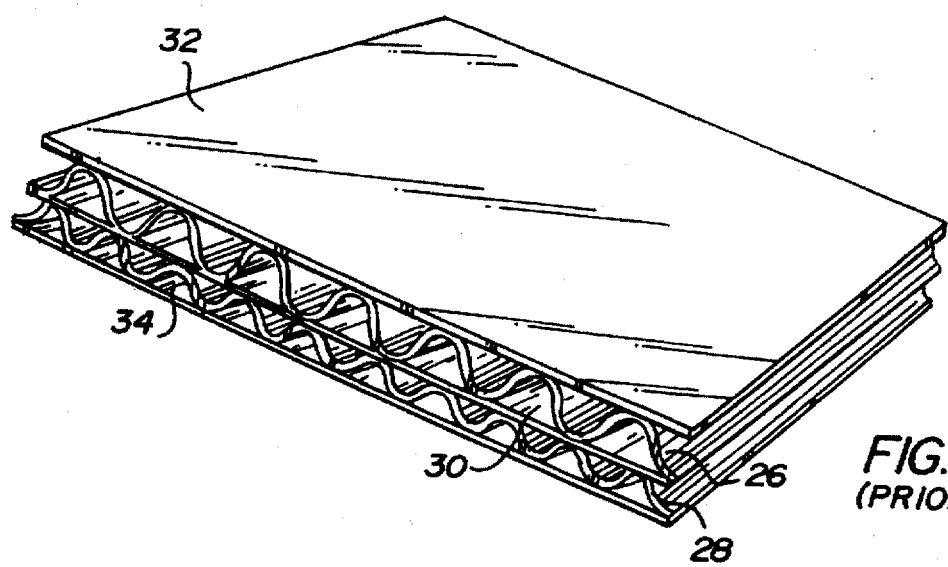
FIG.2C
(PRIOR ART)
FIG.2D
(PRIOR ART)
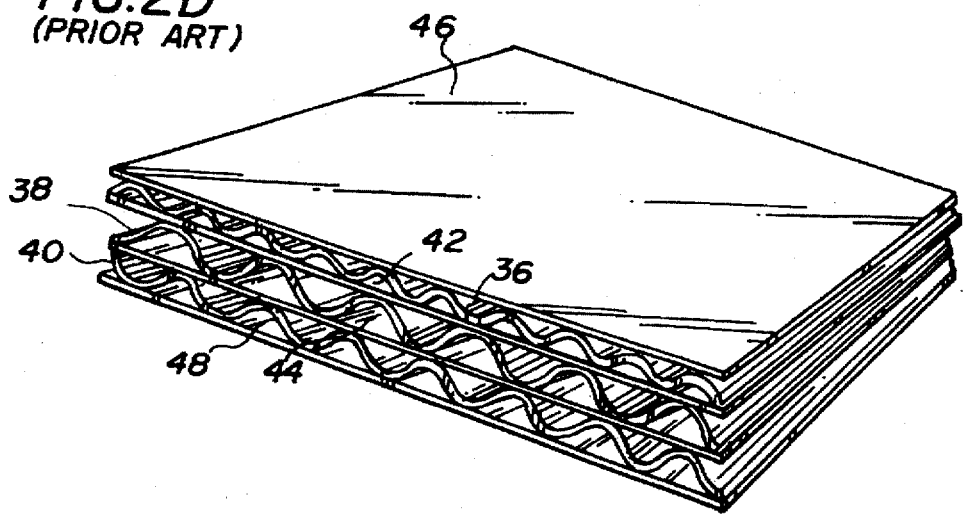

LAMINATE SHEET MATERIAL

RELATED APPLICATIONS

This application is a continuation-in-part of commonly owned application Ser. No. 08/421,328 (atty. dkt. #1491-14), filed Apr. 13, 1995 pending.

BACKGROUND

There are a number of current air filter constructions where spacers or separators are utilized between sections of the filter media. These separators or spacers have been constructed of conventional fiberboard material, roller coated with a water base D fire retardant. This product is not particularly desirable, however, because the roller coating causes the fiberboard material to retain moisture and induces fungus growth. In all cases, the material must conform with UL specifications relating to fire retardation and mildew resistance for internal web supports.

One method which meets UL specs includes the dipping of finished parts in ceramic materials, but this process is cost prohibitive. Currently, UL approved methods include spacers or web supports stamped from sheet metal but here again, cost is a significant negative factor.

DISCLOSURE OF THE INVENTION

The present invention is designed to overcome problems with the above described prior art products by providing a low cost laminate sheet material which meets all UL specifications relating to fire retardation and mildew resistance.

This invention provides a laminate material which includes thin outer sheets or layers of a particular composition sandwiched about a core of conventional corrugated cardboard.

More specifically, the material comprising the outer layers is preferably a composite of delignified cellulosic material and an isocyanate resin. In the preferred composition, the cellulosic material is "kraft linerboard" commonly used to form the outer layers of corrugated board typically used in the construction of shipping cartons. The preferred resin is a polyisocyanate compound, poly (diphenylmethane), in combination with an organic solvent such as propylene carbonate. A fire retardant additive is included in the resin for certain applications, including the air filter separators described herein. In the preferred arrangement, the kraft linerboard is impregnated with the polyisocyanate resin (and fire retardant additive) and then cured by simultaneous application of heat and pressure.

The core material utilizes standard corrugated cardboard, having selected flute specifications, depending on core density requirements. The flutes of the corrugated core are arranged to run lengthwise in a plane parallel to the planes defined by the outer layers of the composite. In the exemplary embodiment, conventional, single wall corrugated is utilized to form the core, and the resultant composite laminate is used as filter separating material in an air filter. The exemplary material in accordance with this invention has been found to meet UL fire resistant specifications, while also maintaining superior rigidity characteristics.

In its broader aspects, the invention comprises a composite laminate sheet member comprising outer layers of a polymer cellulose material sandwiched about a core of corrugated cardboard, the core of corrugated cardboard having flutes running in a plane parallel to the outer layers.

In another aspect, the invention comprises a filter medium separator for use in air filter constructions comprising a composite laminate sheet member comprising outer layers of a polymer cellulose material and including a fire retardant additive, sandwiched about a core of corrugated cardboard, the core of corrugated cardboard having flutes running in a plane parallel to the outer layers.

Other objects and advantages of the invention will become apparent from the description which follows.

BRIEF DESCRIPTION OF THE DRAWINGS

FIGS. 2A–2D is a are perspective views of known types of corrugated cardboard, useful in the present invention;

DETAILED DESCRIPTION OF THE DRAWINGS

Figure 1:
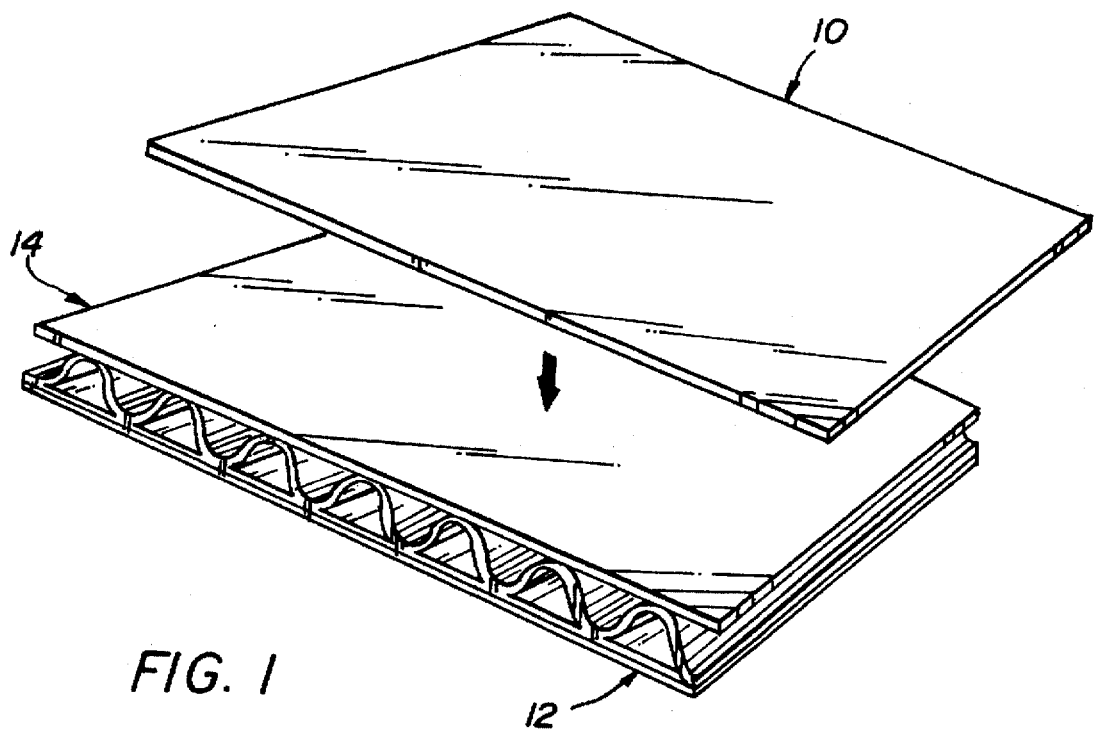
FIG. 1 is a partially exploded perspective of a composite laminate sheet in accordance with this invention.

With reference initially to FIGS. 1 and 2, the structural laminate of this invention comprises two outer layers of polymer cellulose material 10 and 12 sandwiched about an inner core 12 of corrugated cardboard.

The specific polymer cellulose material employed in making the outer layers 10 and 12 is commercially available from Weyerhauser Company and is sold under the trade name P-Cel™. The material is made in the manner disclosed in U.S. Pat. Nos. 5,140,086 and 5,008,356. This is a composite material of 80–90% delignified cellulose and 10–20% thermoset polymers, and is available in thicknesses between 0.004" and 1.00". For purposes of this invention, layers 10 and 12 may be about 0.033" thick. As disclosed in the '086 patent, the cellulosic material is selected from the group consisting of pulped cellulose fibers, chemical pulps, thermomechanical pulps, bleached and unbleached paper and paper-like materials, non-woven mats, sheets and felts. The preferred cellulosic material component of the composite is kraft linerboard, a paper-like board made according to the kraft (sodium sulfate) method of papermaking. The preferred polymer is a polyisocyanate compound, poly (dephenylmethane diisocyanate) also known as PMDI (available from Dow Chemical Corporation of Midland, Mich. under the name PAPI-2027). An organic solvent is used as a diluent for the PMDI, and the preferred solvent is propylene carbonate. The mixture of the PMDI and solvent is referred to simply as an isocyanate resin. Reference is made to the '359 and '086 patents for a detailed discussion of the manufacturing process which produces the polymer cellulose material which is particularly suitable for use with this invention.

The inner core 14 is conventional corrugated cardboard. The density of the core can be varied to suit requirements, by varying the flute selection. Standard flute designations are differentiated by a specific number of flutes per unit length and specific chordal heights. It will be appreciated that core strength increases with flute density. Standard flute specifications are provided below in Table I.

TABLE 1

| Standard Flute Specification | | |
|---|---|---|
| Standard Contour | Flutes Per Horizontal Foot | Chordal Height - In. |
| A-flute | 33 | 0.185 |
| B-flute | 47 | 0.093 |
| C-flute | 39 | 0.135 |
| E-flute | 90 | 0.045 |
| F-flute | 128.0 | 0.028 |
| L-flute | 24.7 | 0.271 |

The choice of flute for the corrugated core 14 will depend on specific design requirements. Generally, B, C, E or L flutes are preferred for this invention. In addition to flute selection, it will be understood that various standard corrugated constructions may be used in the invention, including single face, single wall, double wall and triple wall. Of the above, triple wall provides the greatest strength. Thus, triple wall construction combined with the density of B-flute, provides a core of exceptional strength. Single wall corrugated, however, is sufficient for the exemplary embodiment described herein.

Figure 2A:
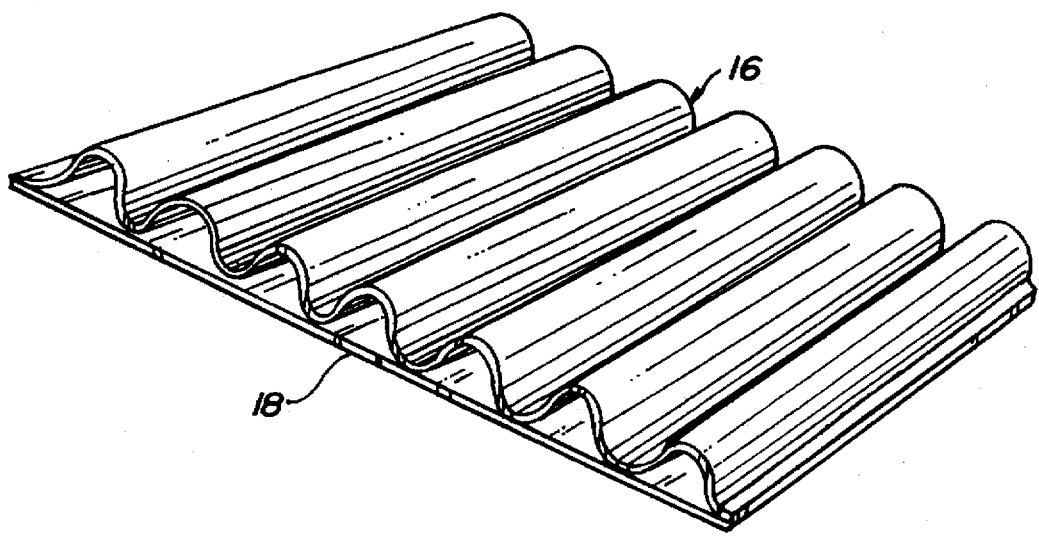

FIG. 2A illustrates conventional single face corrugated, which includes one layer 16 of corrugated medium and a single layer 18 of linerboard.

FIG. 2B illustrates conventional single wall corrugated, including one layer 20 of corrugated medium sandwiched between a pair of layers 22, 24 of linerboard.

FIG. 2C illustrates conventional double wall corrugated, including two layers 26, 28 of corrugated medium (in this case, with an A-B flute construction), separated by an intermediate layer 30 of linerboard, and sandwiched between outer layers 32, 34 of linerboard.

FIG. 2D illustrates conventional triple wall corrugated, including three layers 36, 38 and 40 of corrugated medium (in this case, with B-A-C flute construction), where the corrugated layers are separated by intermediate layers 42 and 44 of linerboard, and wherein outer layers 46 and 48 are also constructed of linerboard.

Figure 3:
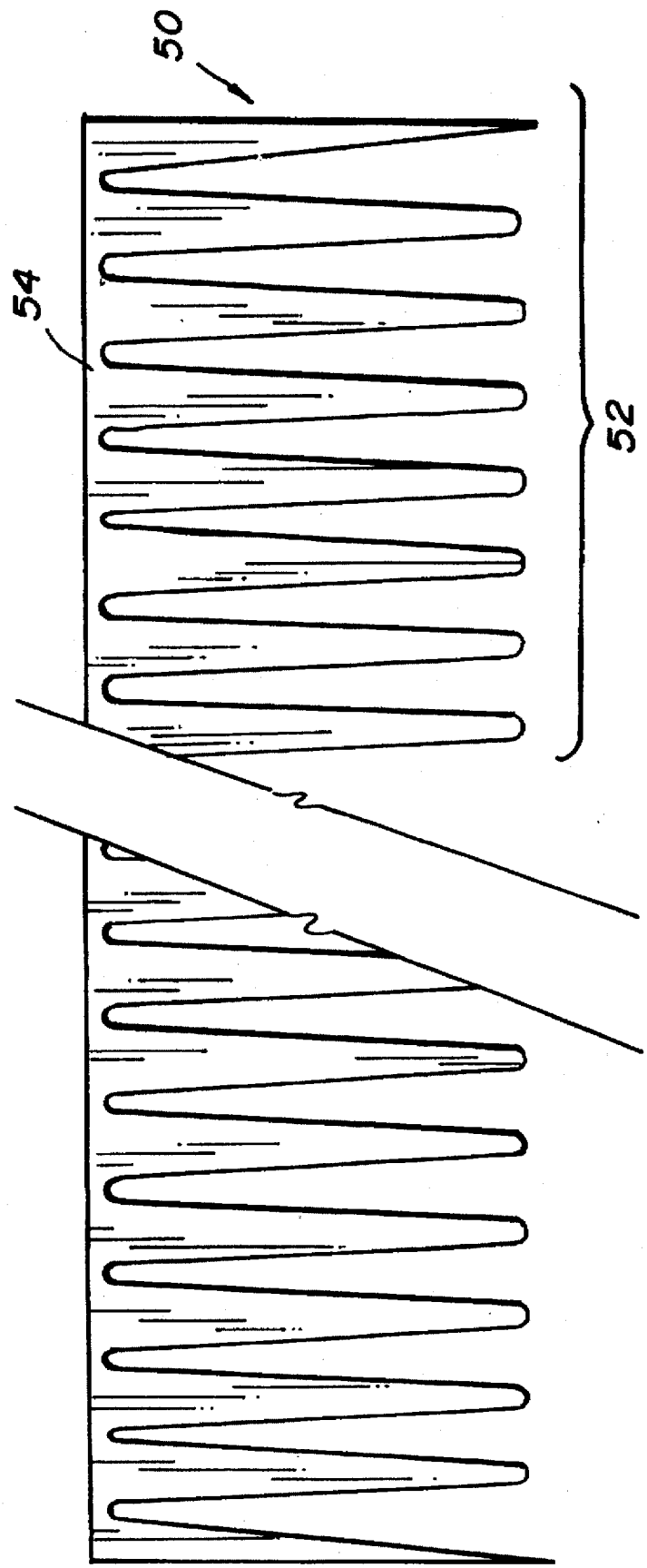
FIG. 3 is a broken plan view of a filter separator sheet in accordance with the invention.
Figure 4:
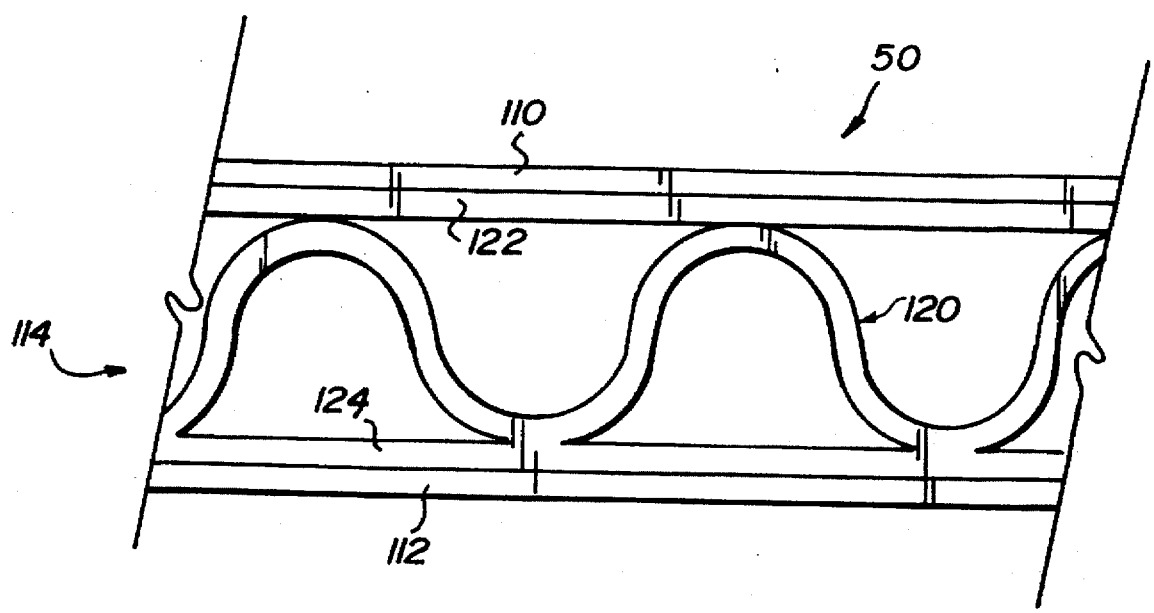
FIG. 4 is a partial rear elevation of the filter separator sheet of FIG. 3.

FIG. 3 illustrates one application for the subject invention. Here, the composite laminate sheet 50 includes outer layers 110, 112 similar to layers 10, 12 described hereinabove, sandwiched about a core 114 which comprises single wall corrugated including a layer 120 of corrugated medium sandwiched between layers 122, 124 of linerboard. The sheet 50 is die cut to include a plurality of finger-like projections 52 extending from a common base portion 54. This configuration is particularly useful as filter separator material in particular air filter constructions. It will be appreciated that the material may be die cut to whatever shape is called for in the particular application and the "finger board" shown in FIG. 3 is merely exemplary. Preferably, a fire retardant additive is incorporated into the outer layers of cellulose polymer material. One suitable additive is known as Spartan FR54A. This material passes UL specifications for fire retardation as well as mildew resistance for internal web supports on various air filter constructions.

The present invention has many other applications as well, including vehicle door panels and headliners, packaging, computer related products and panels where low cost and strength are of concern.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A composite laminate member comprising outer planar layers of delignified polymer cellulose material impregnated with a polyisocyanate compound and a fire retardant sandwiched about a core of corrugated cardboard, said core of corrugated cardboard including at least one layer of linerboard and layer of corrugated medium, said corrugated medium having flutes running in a plane parallel to said outer layers.

2. The composite laminate sheet member of claim 1 wherein said core of corrugated cardboard includes a layer of corrugated medium sandwiched between a pair of layers of linerboard.

3. The composite laminate sheet member of claim 1 wherein the polymer cellulose material comprises kraft linerboard and wherein the polyisocyanate compound is diluted with a solvent.

4. A filter medium separator for use in air filter constructions comprising a planar composite laminate member comprising outer layers of a delignified polymer cellulose material impregnated with a polyisocyanate compound and a fire retardant sandwiched about a core of corrugated cardboard, said core of corrugated cardboard including at least one layer of linerboard and layer of corrugated medium, said corrugated medium having flutes running in a plane parallel to said outer layers, said planar composite laminate member cut to include a plurality of finger-like projections extending from a common base portion.

5. The composite laminate sheet member of claim 4 wherein said core of corrugated cardboard comprises a layer of corrugated medium sandwiched between a pair of layers of linerboard.

6. The composite laminate sheet member of claim 4 wherein the polymer cellulose material comprises kraft linerboard and wherein the polyisocyanate compound is diluted with a solvent.

* * * * *